(12) United States Patent
Abotabl et al.

(10) Patent No.: US 11,778,590 B2
(45) Date of Patent: Oct. 3, 2023

(54) TECHNIQUES FOR SELECTING A SIDELINK SENSING MODE BASED ON DUPLEX MODE

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 17/232,923

(22) Filed: Apr. 16, 2021

(65) Prior Publication Data

US 2022/0338170 A1    Oct. 20, 2022

(51) Int. Cl.
*H04W 72/02* (2009.01)
*H04L 5/14* (2006.01)
*H04W 72/0446* (2023.01)
*H04W 72/0453* (2023.01)
*H04W 74/08* (2009.01)
*H04W 72/20* (2023.01)

(52) U.S. Cl.
CPC ............ *H04W 72/02* (2013.01); *H04L 5/14* (2013.01); *H04W 72/0446* (2013.01); *H04W 72/0453* (2013.01); *H04W 72/20* (2023.01); *H04W 74/0816* (2013.01)

(58) Field of Classification Search
CPC ............ H04W 72/02; H04W 72/0406; H04W 72/0446; H04L 5/14
See application file for complete search history.

(56) References Cited

U.S. PATENT DOCUMENTS 11,310,776 B2 *  4/2022  Maaref ............ H04W 72/0486
11,425,660 B2 *  8/2022  Zhao ..................... H04W 52/12
(Continued)

FOREIGN PATENT DOCUMENTS

WO    WO-2018028768 A1    2/2018
WO    WO-2020011336 A1    1/2020

OTHER PUBLICATIONS

International Search Report and Written Opinion—PCT/US2022/070810—ISA/EPO—dated Jun. 1, 2022.
(Continued)

*Primary Examiner* — Raj Jain
(74) *Attorney, Agent, or Firm* — Holland & Hart LLP

(57) ABSTRACT

Methods, systems, and devices for wireless communications are described. In some examples, a transmitting user equipment (UE) may receive control signaling indicating a configuration including criterion for selecting a sensing mode for a sidelink resource selection procedure. The transmitting UE may select the sensing mode based on the configuration and a duplex mode configured for a sensing window and determine available resources based on the performing channel sensing according to the selected sensing mode. The transmitting UE may then select one or more of the available resource to transmit one or more sidelink message to a receiving UE.

29 Claims, 11 Drawing Sheets

(56) References Cited

U.S. PATENT DOCUMENTS

2020/0196279 A1* 6/2020 Thomas .................. H04W 4/40
2022/0295552 A1* 9/2022 Shin .................. H04W 74/0808
2022/0312479 A1* 9/2022 Farag ................ H04W 72/1231

OTHER PUBLICATIONS

Liao Y., et al., "Listen-and-Talk: Protocol Design and Analysis for Full-Duplex Cognitive Radio Networks", arxiv.org, Cornell University Library, 201 OLIN Library Cornell University Ithaca, NY 14853, Feb. 24, 2016 (Feb. 24, 2016), XP080685720, 11 Pages, section II, section III.A, figure 1.

Nokia, et al., "Discussion of Side Link Resource Allocation For Power Saving", 3GPP Draft, R1-2005500, 3GPP TSG RAN WG1 Meeting #102-e, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020 (Aug. 8, 2020), XP051917509, 3 Pages, Retrieved from the Internet: URL:https://ftp,3gpp.org/tsg_ran/WG1_RL1/TSGR1_102-e/Docs/R1-2005500.zip R1-2005500-Nokia-FS_NR_V2X-resourceallocation for power saving_updated. docx [retrieved on Aug. 8, 2020] section 2 figure 1.

* cited by examiner

TECHNIQUES FOR SELECTING A SIDELINK SENSING MODE BASED ON DUPLEX MODE

FIELD OF TECHNOLOGY

The following relates to wireless communications, including techniques for selecting a sidelink sensing mode based on duplex mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink communication. Sidelink communication may be described as communication between two or more wireless devices (e.g., two or more UEs). To support sidelink communication, a transmitting UE may perform channel sensing during a sensing window to determine available sidelink resources on which to transmit a message to a receiving UE. In some instances, sensing may be inaccurate which may result in inefficient utilization of sidelink resources.

SUMMARY

The described techniques relate to improved methods, systems, devices, and apparatuses that support techniques for selecting a sidelink sensing mode based on duplex mode. Generally, the described techniques provide for a user equipment (UE) to select a sensing mode for a sidelink resource selection procedure using a configuration received from a base station. In some examples, the configuration may include criterion for selecting the sensing mode, where the criterion is based on a duplex mode configured for a sensing window.

A method for wireless communication at a UE is described. The method may include receiving control signaling indicating a configuration including one or more criterion for selecting a sensing mode from a set of multiple sensing modes for a sidelink resource selection procedure, selecting the sensing mode from the set of multiple sensing modes based on the configuration and a duplex mode configured for a sensing window for the sidelink resource selection procedure, determining an available set of sidelink resource candidates from a selection window based on the selected sensing mode, and transmitting a sidelink message using one or more resources of the available set of sidelink resource candidates.

An apparatus for wireless communication at a UE is described. The apparatus may include a processor, memory coupled with the processor, and instructions stored in the memory. The instructions may be executable by the processor to cause the apparatus to receive control signaling indicating a configuration including one or more criterion for selecting a sensing mode from a set of multiple sensing modes for a sidelink resource selection procedure, select the sensing mode from the set of multiple sensing modes based on the configuration and a duplex mode configured for a sensing window for the sidelink resource selection procedure, determine an available set of sidelink resource candidates from a selection window based on the selected sensing mode, and transmit a sidelink message using one or more resources of the available set of sidelink resource candidates.

Another apparatus for wireless communication at a UE is described. The apparatus may include means for receiving control signaling indicating a configuration including one or more criterion for selecting a sensing mode from a set of multiple sensing modes for a sidelink resource selection procedure, means for selecting the sensing mode from the set of multiple sensing modes based on the configuration and a duplex mode configured for a sensing window for the sidelink resource selection procedure, means for determining an available set of sidelink resource candidates from a selection window based on the selected sensing mode, and means for transmitting a sidelink message using one or more resources of the available set of sidelink resource candidates.

A non-transitory computer-readable medium storing code for wireless communication at a UE is described. The code may include instructions executable by a processor to receive control signaling indicating a configuration including one or more criterion for selecting a sensing mode from a set of multiple sensing modes for a sidelink resource selection procedure, select the sensing mode from the set of multiple sensing modes based on the configuration and a duplex mode configured for a sensing window for the sidelink resource selection procedure, determine an available set of sidelink resource candidates from a selection window based on the selected sensing mode, and transmit a sidelink message using one or more resources of the available set of sidelink resource candidates.

Some examples of the method, apparatuses, and non-transitory computer-readable medium described herein may further include operations, features, means, or instructions for determining whether the duplex mode configured for the sensing window includes a full-duplex mode or a half-duplex mode, where the one or more criterion may be based on whether the duplex mode configured for the sensing window includes the full-duplex mode or the half-duplex mode.

In some examples of the method, apparatuses, and non-transitory computer-readable medium described herein, the one or more criterion include a first set of probabilities for selecting the sensing mode when the duplex mode configured for the sensing window includes a full-duplex mode and a second set of probabilities for selecting the sensing mode when the duplex mode configured for the sensing window includes a half-duplex mode.

Some examples of the method, apparatuses, and non-transitory computer-readable medium described herein may further include operations, features, means, or instructions for determining that the duplex mode configured for the sensing window includes the full-duplex mode, where the sensing mode may be selected according to a probability of the first set of probabilities.

Some examples of the method, apparatuses, and non-transitory computer-readable medium described herein may further include operations, features, means, or instructions for determining that the duplex mode configured for the sensing window includes the half-duplex mode, where the sensing mode may be selected according to a probability of the second set of probabilities.

In some examples of the method, apparatuses, and non-transitory computer-readable medium described herein, the first set of probabilities and the second set of probabilities include probabilities of selecting a no-sensing mode from the set of multiple sensing modes.

In some examples of the method, apparatuses, and non-transitory computer-readable medium described herein, the first set of probabilities include probability values that may be greater than one or more probability values of the second set of probabilities.

In some examples of the method, apparatuses, and non-transitory computer-readable medium described herein, the set of multiple sensing modes include at least a no-sensing mode, a partial-sensing mode, and a full-sensing mode.

In some examples of the method, apparatuses, and non-transitory computer-readable medium described herein, each probability of the first set of probabilities corresponds to a respective frequency allocation structure of a set of multiple frequency allocation structures for a time resource associated with the sensing window.

In some examples of the method, apparatuses, and non-transitory computer-readable medium described herein, the set of multiple frequency allocation structures includes an in-band full-duplex structure and a sub-band full-duplex structure.

Some examples of the method, apparatuses, and non-transitory computer-readable medium described herein may further include operations, features, means, or instructions for determining that a time resource associated with the sensing window may be reserved for a transmission by the UE, where selecting the sensing mode may be based at least on determining that the time resource associated with the sensing window may be reserved for the transmission by the UE during the sensing window.

In some examples of the method, apparatuses, and non-transitory computer-readable medium described herein, selecting the sensing mode from the set of multiple sensing modes may include operations, features, means, or instructions for selecting a no-sensing mode based on determining that the time resource associated with the sensing window may be reserved for the transmission by the UE.

Some examples of the method, apparatuses, and non-transitory computer-readable medium described herein may further include operations, features, means, or instructions for measuring an amount of interference associated with reference signaling in the sensing window based on the selected sensing mode, where determining the available set of sidelink resource candidates may be based on measuring the amount of interference.

In some examples of the method, apparatuses, and non-transitory computer-readable medium described herein, measuring the amount of interference may include operations, features, means, or instructions for measuring a reference signal received power (RSRP) associated with the reference signaling in the sensing window, a signal-to-interference-plus-noise ratio (SINR) associated with the reference signaling in the sensing window, or both.

In some examples of the method, apparatuses, and non-transitory computer-readable medium described herein, receiving control signaling indicating the configuration may include operations, features, means, or instructions for receiving radio resource control (RRC) signaling or medium access control (MAC) control element (MAC-CE) signaling from a base station.

DETAILED DESCRIPTION

Figure 1:
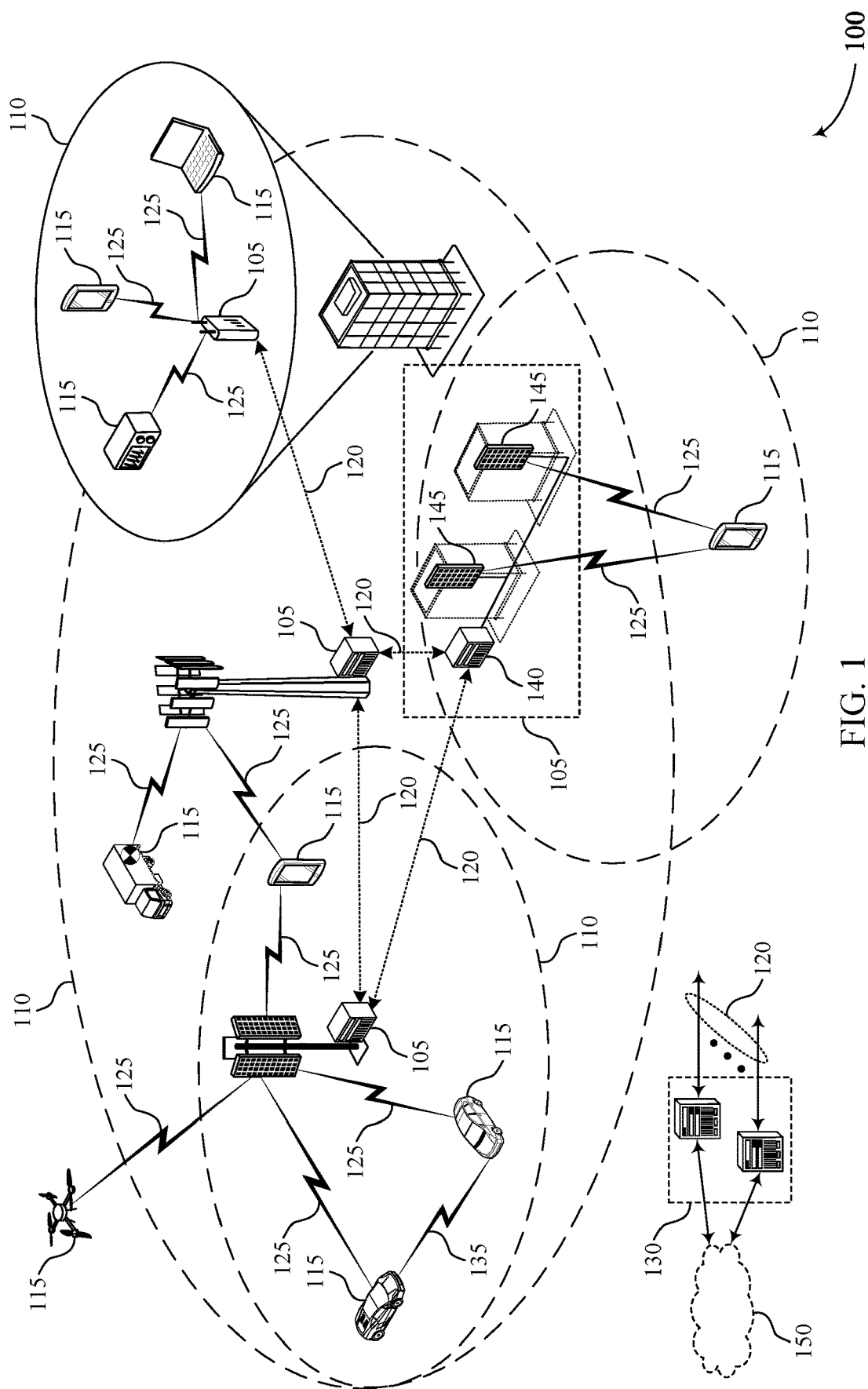
FIGS. 1 and 2 illustrate examples of a wireless communications system that supports techniques for selecting a sidelink sensing mode based on duplex mode in accordance with aspects of the present disclosure.

In some examples, a wireless communications system may support sidelink communication or communication between two or more wireless devices (e.g., two or more user equipment (UEs)). In mode 2, a first UE (e.g., a transmitting UE) may autonomously select resources for transmission of one or more sidelink messages to a second UE (e.g., a receiving UE) using a sidelink resource selection procedure. As part of the sidelink resource selection procedure, the first UE may select a sensing mode (e.g., a no-sensing mode, a partial-sensing mode, or a full-sensing mode) and perform sensing on resources of a sensing window according to the selected sensing mode. If the first UE selects a full-sensing mode, the first UE may perform sensing on all slots of the sensing window. That is, the first UE may decode sidelink control information (SCI) of other UEs to determine what resources are reserved by the other UEs and in some cases, may measure signal strengths associated with the reserved resources using the decoded SCIs. The resources that are not reserved by the other UEs and the reserved resources associated with a measured signal strength value below a threshold may be deemed available and the first UE may select one or more of these available resource to utilize for transmission of the one or more sidelink messages to the second UE.

However, the first UE may not take into account a duplex mode configured for the sensing window during the sidelink resource selection procedure. In some examples, the sensing window may be associated with a full-duplex mode of operation. That is, the first UE may simultaneously transmit and receive signals during the sensing window. In such case, the first UE may transmit a signal while performing sensing. But simultaneously transmitting a signal while performing sensing may introduce some interference at the first UE. This interference may result in inaccurate signal strength measurements and may consequently lead to the first UE to misinterpret which resources are available.

In some examples, the first UE may select a sensing mode (e.g., a no-sensing mode, a partial-sensing mode, or a full-sensing mode) for the sidelink resource selection procedure based on a duplex mode configured for the sensing window. For example, the first UE may receive a configuration indicating criterion for selecting a sensing mode for the sidelink resource selection procedure. The configuration may indicate for first UE to select a no-sensing mode for the sidelink resource selection procedure if the sensing window is configured for a full-duplex mode of operation. That is, the first UE may refrain from performing sensing in the sensing window and select resources for transmitting the one or more sidelink messages to the second UE randomly. Additionally, the configuration may indicate for the first UE to select one of any of the sensing modes (e.g., a no-sensing mode, a full-sensing mode, or a partial-sensing mode) if the sensing window is configured for a half-duplex mode of operation. In another example, the criterion may include probabilities for selecting a no-sensing mode for the sidelink resource selection procedure based on whether the sensing window is configured for full-duplex or half-duplex. For example, the configuration may indicate for the first UE to select a no-sensing mode 90% of the time if the sensing window is configured for full-duplex operation and may indicate for the first UE to select a no-sensing mode 10% of the time if the sensing window is configured for half-duplex operation.

The criterion may also include multiple probabilities for selecting a sensing mode based on a full-duplex slot structure or a full-duplex frequency allocation scheme configured for the sensing window. In other examples, the criterion may be based on whether the first UE is actively transmitting during the sensing window. That is, the configuration may indicate for the first UE to select a no-sensing mode for the sidelink resource selection procedure if the first UE is actively transmitting during the sensing window and to select any one of the sensing modes if the first is not actively transmitting during the sensing window. Using the described techniques, UEs may conserve power by not performing sensing when the sensing window falls within full-duplex slots and may avoid making inaccurate signal strength measurement due to interference.

Aspects of the disclosure are initially described in the context of wireless communications systems. Additional aspects of the disclosure are described in the context of a sensing scheme and a process flow. Aspects of the disclosure are further illustrated by and described with reference to apparatus diagrams, system diagrams, and flowcharts that relate to techniques for selecting a sidelink sensing mode based on duplex mode.

FIG. 1 illustrates an example of a wireless communications system 100 that supports techniques for selecting a sidelink sensing mode based on duplex mode in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, a UE 115 may select a sensing mode for a sidelink resource selection procedure using a configuration from the base station 105. The configuration may include criterion for selecting the sensing mode, where the criterion is associated with a duplex mode configured for the sensing window. In some examples, the configuration may instruct the UE 115 to select a first sensing mode (e.g., a no-sensing mode) when the sensing window falls within full-duplex slots and a second sensing mode (e.g., a no-sensing mode, a partial-sensing mode, or a full-sensing mode) when the sensing window falls within half-duplex slots. In other examples, the criteria may include probabilities for selecting a sensing mode (e.g., a no-sensing mode), where the probabilities are based on a duplex mode configured for the sensing window. The described techniques may allow a UE 115 to conserve power during a sidelink resource selection procedure in situations that sensing may be accurate.

Figure 2:
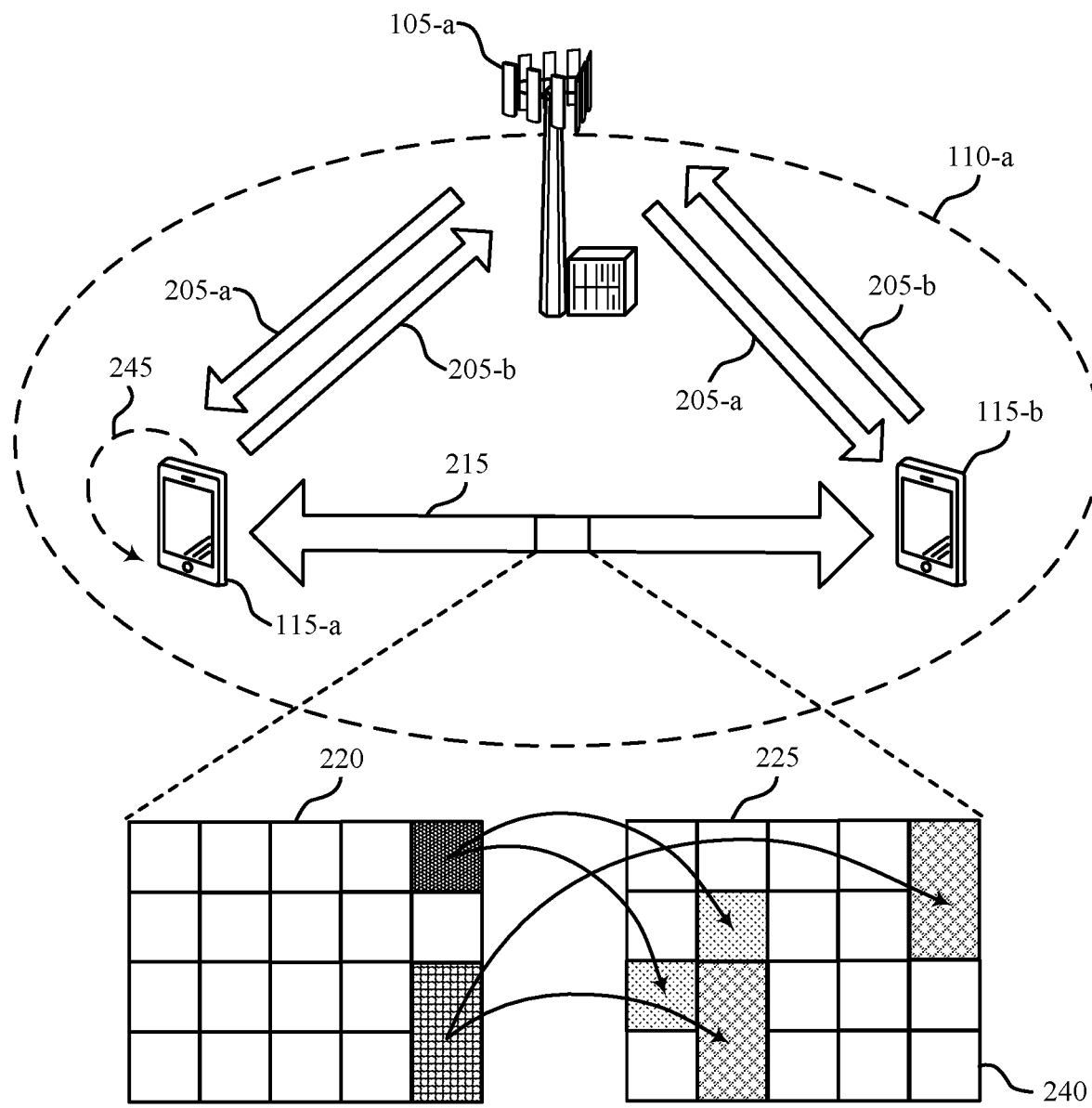

FIG. 2 illustrates an example of a wireless communications system 200 that supports techniques for selecting a sidelink sensing mode based on duplex mode in accordance with aspects of the present disclosure. The wireless communications system 200 may include a base station 105-a, a UE 115-a, and a UE 115-b, which may be examples of a base station 105 and UEs 115 as described with reference to FIG. 1. In some examples, the base station 105-a, the UE 115-a, and the UE 115-b may be located in a geographic coverage area 110-a. The base station 105-a may communicate with the UE 115-a and the UE 115-b via downlink communication links 205-a and uplink communication links 205-b. Additionally, the UE 115-a may communicate with the UE 115-b via a sidelink communication link 215 (e.g., a PC5 link). In some examples, one or both of the UE 115-a and the UE 115-b may perform a sidelink resource selection procedure which may include performing sensing in a channel sensing window 220 and reserving sidelink resources in a resource selection window 225 based on the sensing.

Sidelink communication may be described as communication between two or more wireless devices (e.g., communication between the UE 115-a and the UE 115-b). To facilitate sidelink communication, the UE 115-a and the UE 115-b may be configured with a set of resources (e.g., time and frequency resources) for sidelink communication (e.g., one or more sidelink resource pools). A sidelink resource pool may include one or more subchannels in a frequency domain and one or more slots in a time domain. That is, the sidelink resource pool may include multiple resource elements 240.

In some examples, the UE 115-a or the UE 115-b may select resources for sidelink transmissions according to mode 1. For mode 1, the base station 105-a may indicate a set of resources within the one or more sidelink resource pools to the UE 115-a or the UE 115-b and the UE 115-a or the UE 115-b may utilize the set of resources for sidelink transmissions. For example, the base station 105-a may transmit, to the UE 115-a, an indication of a set of resources to use to transmit a message to the UE 115-b and the UE 115-a may utilize one or more resources of the set to transmit the message to the UE 115-b.

Alternatively, the UE 115-a or the UE 115-b may select resources for sidelink transmissions according to mode 2. For mode 2, the UE 115-a or the UE 115-b may select a set of resources from the one or more resource pools for sidelink transmissions autonomously (e.g., without signaling from the base station 105-a). In either case, the UE 115-a may transmit SCI to the UE 115-b indicating the selected set of resources such that the UE 115-b may locate and decode transmissions from the UE 115-a. As such, resource selection may vary between mode 1 and mode 2.

To identify what sidelink resources are available when the UE 115-a or the UE 115-b is operating in mode 2, the UE 115-a or the UE 115-b may perform channel sensing. In some examples, the UE 115-a or the UE 115-b may perform channel sensing in the sensing window 220. The sensing window 220 may be associated with the resource selection window 225. The resource selection window 225 may come after the sensing window 220 in time and may include a set of candidate resources (e.g., resources that the UE 115-a or the UE 115-b may potentially transmit on). Because UEs 115 may be configured with the same sidelink resources, some of the candidate resources may be occupied. As such, the UE 115-a may perform sensing during the sensing window 220 to determine an available set of candidate resources. Sensing may refer to the UE 115-a or the UE 115-b monitoring for reference signaling on resource elements 240 of the sensing window 220. For example, the UE 115-a or the UE 115-b may monitor for SCI of other UEs 115 received on sidelink control resources 230. Decoding SCI of other UEs 115 may inform the UE 115-a or the UE 115-b of which resources of the candidate resources in resource selection window 225 are reserved for transmission by other UEs 115 (e.g., reserved resources 235). In some examples, the UE 115-a or the UE 115-b may determine that all resources of the resource selection window 225 excluding the reserved resources 235 are available.

In another example, the UE 115-a or the UE 115-b may utilize the SCI from other UEs 115 to measure signal strengths (e.g., reference signal received power (RSRP)) associated with the reserved resources 235 (e.g., using demodulation reference signals (DMRSs)). If the UE 115-a or the UE 115-b determines that the measured signal strength of a reserved resource 235 is below a threshold, the UE 115-a or the UE 115-b may deem the reserved resource 235 available. In some examples, the UE 115-a or the UE 115-b may increase or decrease the threshold based on a percentage of available resources in the resource selection window 225 or a priority associated with the UE 115-a or the UE 115-b.

In some examples, the UE 115-a or the UE 115-b may perform sensing according to different sensing modes. The different sensing mode may be a no-sensing mode, a partial-sensing mode, and a full-sensing mode. In a no-sensing mode, the UE 115-a or the UE 115-b may not perform sensing in the sensing window 220 and may select resources from the resource selection window 225 randomly. In a partial-sensing mode, the UE 115-a or the UE 115-b may sense random slots of the sensing window 220 and determine available resource based on sensing the random slots. In a full-sensing mode, the UE 115-a or the UE 115-b may sense all slots of the sensing window 220 and determine available resources based on sensing all of the slots. In some examples, a UE 115-a and a UE 115-b may utilize no-sensing or partial-sensing as opposed to full-sensing to save power or if the UE 115-a or the UE 115-b are low capability UEs.

Once the UE 115-a or the UE 115-b determines the available resources, the physical layer may indicate the available resources to higher layers, and the higher layers may perform resource selection and reservation. In some examples, the selected resources may be reserved for a sidelink message, a retransmission of a sidelink message, or both. The UE 115-a or the UE 115-b may select and reserve resources such that all retransmission for a sidelink packet may occur within a configured delay period (e.g., a packet delay budget (PDB)). In some examples, the UE 115-a or the UE 115-b may select the one or more available resources based on a trigger which occurs some time after the sensing window 220. The trigger may serve as an indication that the UE 115-a or the UE 115-b has pending data to transmit. The duration from the start of the sensing window 220 to the trigger may be preconfigured by the network (e.g., 100 ms or 1100 ms). In some examples, the UE 115-a and the UE 115-b may confirm resource availability some time before the resource selection window 225 and the duration between the trigger to the end of the resource selection window 225 may be preconfigured by the network per priority $\{1, 5, 10, 20\} \cdot 2^\mu$, $\mu=0, 1, 2, 3$ for a subcarrier spacing of 15 kHz, 30 kHz, 60 kHz, or 120 kHz, respectively.

In some examples, the wireless communications system 200 may support different duplex modes. For example, the UE 115-a may operate according to one of a half-duplex mode or a full-duplex mode. In a full-duplex mode, the UE 115-a may transmit and receive concurrently (e.g., on the same time resources). In a half-duplex mode, the UE 115-a may transmit and receive on different time resources. In some example, the sensing window 220 may be located in one or more full-duplex slots. As such, the UE 115-a may monitor for and receive reference signaling in the sensing window 220, and the UE 115-a may additionally or alternatively transmit uplink data, sidelink data, or both, in the sensing window 220. Simultaneously transmitting and sensing may introduce some interference 245 at the UE 115-a and the interference 245 may negatively impact channel sensing. That is, the interference 245 may cause the UE 115-a to make inaccurate signal strength measurements associated with the reference signaling. For example, the interference 245 may increase an RSRP measurement, and UE 115-a may incorrectly assume that fewer resources are available than if the interference 245 had not occurred.

As described herein, a UE 115-*a* accessing a sidelink channel via mode 2 may select a sensing mode for the resource selection procedure based on duplex modes. In some examples, the UE 115-*a* or the UE 115-*b* may receive control signaling from the base station 105-*a*. The control signaling may indicate a configuration including criterion for selecting a sensing mode for a resource selection procedure. The control signaling indicating the configuration may include RRC signaling or medium access control (MAC) control element (MAC-CE) signaling. In some examples, the criterion may be based on a duplex mode configured for sensing window 220. For example, the configuration may instruct the UE 115-*a* or the UE 115-*b* to select a no-sensing mode if the sensing window 220 falls within one or more full-duplex slot. Upon selecting the no-sensing mode, the UE 115-*a* or the UE 115-*b* may not sense the slots of the sensing window 220 and may select resources from the resource selection window 225 randomly (e.g., random selection). If the sensing window 220 does not fall within one or more full-duplex slots (e.g., falls within half-duplex slots), the UE 115-*a* or the UE 115-*b* may select the sensing mode for resource selection according to normal procedures. That is, the UE 115-*a* or the UE 115-*b* may select the sensing mode (e.g., no-sensing, partial-sensing, or full-sensing) based on parameters different than the duplex mode configured for the sensing window (e.g., capability of the UEs 115).

In another example, the criterion may include a probabilities for selecting the sensing mode based on the duplex mode configured for the sensing window 220. For example, the configuration may instruct the UE 115-*a* or the UE 115-*b* to select no-sensing with a first probability if the sensing window 220 falls within full-duplex slots and to select no-sensing with a second probability if the sensing window 220 falls within half-duplex slots. In one example, the first probability may be larger than the second probability. For example, if the sensing window 220 falls within full-duplex slots, the UE 115-*a* or the UE 115-*b* may select no-sensing with a probability of 90% and any other sensing mode (e.g., a no-sensing mode, a partial-sensing mode, or a full-sensing mode) with a probability of 10%. Alternatively, if the sensing window 220 falls within half-duplex slots, the UE 115-*a* or the UE 115-*b* may select no-sensing with a probability 10% and any other sensing mode (e.g., a no-sensing mode, a partial-sensing mode, or a full-sensing mode) with a probability of 90%.

Alternatively or additionally, the criteria may include multiple probabilities for selecting no-sensing when a full-duplex mode is configured for the sensing window 220. Each probability may correspond to a different full-duplex slot format. The different full-duplex slot formats may include in-band full-duplex and sub-band full-duplex. In-band full-duplex may describe a scenario in which receiving resources and transmitting resources occupy the same time and frequency resources. That is, the receiving resources at least partially or fully overlapping the transmitting resources. Sub-band full-duplex may describe a scenario in which the transmitting resources and the receiving resources occupy the same time resources, but different frequency resources. That is, the receiving resources and the transmitting resource are separated in the frequency domain by a guard band. The configuration may instruct the UE 115-*a* or the UE 115-*b* to select a no-sensing mode with a first probability if the sensing window 220 falls within sub-band full-duplex slots, a second probability if the sensing window 220 falls within in-band full-duplex slot, and a third probability if the sensing window 220 falls within half-duplex slots. The second probability may be larger than the first probability (e.g., because in-band full-duplex may introduce more interference) and the first probability may be larger than the third probability. Additionally, the first probability and the second probability may change depending on a frequency allocation of the transmitting resources and the receiving resources of the full-duplex slot format (e.g., an amount of overlap between the transmitting resources and the receiving resources, or a size of a guard band).

In another example, the criteria may be based on a duplex mode configured for the sensing window 220 and whether the UE 115-*a* or the UE 115-*b* is actively transmitting during the sensing window 220. For example, the configuration may instruct the UE 115-*a* or the UE 115-*b* to select a no-sensing mode if the UE 115-*a* or the UE 115-*b* has a planned transmission during the sensing window 220 and may select any of a no-sensing mode, a partial-sensing mode, or a full-sensing mode if the UE 115-*a* or the UE 115-*b* does not have a planned transmission during the sensing window 220.

In some examples, the UE 115-*a* or the UE 115-*b* may select either a partial-sensing mode or a full-sensing mode for a resource selection procedure (e.g., based on the configuration). In such example, the UE 115-*a* or the UE 115-*b* may perform sensing (e.g., partial-sensing or full-sensing) in the sensing window 220 to decode SCI from other UEs 115 and determine the reserved resources 235. In some examples, the UE 115-*a* or the UE 115-*b* may measure an amount of interference (e.g., signal-to-interference-plus-noise (SINR)) associated with one or more of the reserved resources 235 and may determine available resources based on the measured amount of interference. For example, the UE 115-*a* or the UE 115-*b* may deem a reserved resources 235 available, if the amount of interference associated with the is below a threshold. Using the above described techniques, a UE 115 may decrease or avoid selecting resources based on inaccurate measurement information in the presence of interference.

Figure 3:
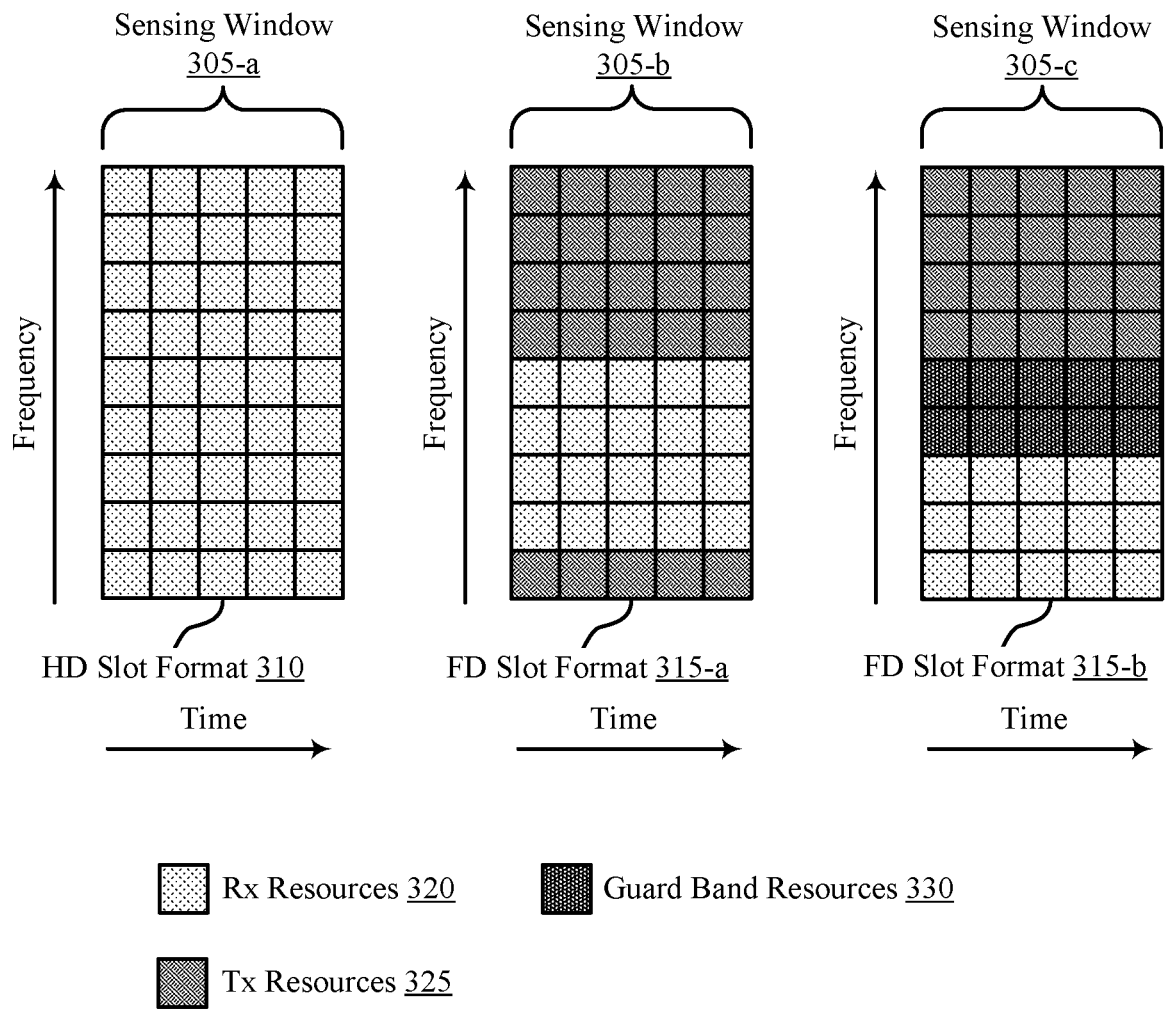
FIG. 3 illustrates an example of a sensing scheme that supports techniques for selecting a sidelink sensing mode based on duplex mode in accordance with aspects of the present disclosure.

FIG. 3 illustrates an example of a sensing scheme 300 that supports techniques for selecting a sidelink sensing mode based on duplex mode in accordance with aspects of the present disclosure. In some examples, the sensing scheme 300 may implement aspects of a wireless communications system 100 and a wireless communications system 200. For example, the sensing scheme 300 may implement or be implemented by UEs 115 as described with reference to FIGS. 1 and 2.

As described with reference to FIG. 2, a transmitting UE may receive control signaling (e.g., from a base station) indicating a configuration including criterion for selecting a sensing mode for a sidelink resource selection procedure. In some examples, the criterion may be based on a duplex mode (e.g., either a half-duplex mode or a full-duplex mode) of a sensing window 305. In one example, the transmitting UE may perform sensing in a sensing window 305-*a*. The sensing window 305-*a* may be configured with a half-duplex slot format 310. That is, the resources of the sensing window 305-*a* may include reception resources 320 and may not include transmission resources 325. Alternatively, the transmitting UE may perform sensing in a sensing window 305-*b* or a sensing window 305-*c*. The sensing window 305-*b* and the sensing window 305-*c* may be configured with a full-duplex slot format 315-*a* and a full-duplex slot format 315-*b*, respectively. That is, the resources of the sensing window 305-*b* and the sensing window 305-*c* may include both transmission resources 325 and reception resources 320. Considering the above, the configuration may instruct the transmitting UE to select any type of sensing mode (e.g., a no-sensing mode, a partial-sensing mode, or a full-sensing mode) for the resource selection procedure when the transmitting UE performs sensing in the sensing window 305-a and to select a no-sensing mode for the resource selection procedure when the transmitting UE performs sensing in the sensing window 305-b or the sensing window 305-c.

In another example, the criteria may include probabilities for selecting a sensing mode based on a duplex mode configured for the sensing window 305. For example, the configuration may include table 335 that includes a probability for selecting a sensing mode for each duplex mode. The table 335 may include a probability for selecting a no-sensing mode for a half-duplex slot format (e.g., p1) and a probability for selecting a no-sensing mode for a full-duplex slot format (e.g., p2). In such example, a transmitting UE whose sensing window 305 is associated with the half-duplex slot format 310 (e.g., sensing window 305-a) may select a no-sensing mode with a probability of p1 during a resource selection procedure and a transmitting UE whose sensing window 305 is associated with a full-duplex slot format 315 (e.g., sensing window 305-b or sensing window 305-c) may select a no-sensing mode with a probability of p2 during a resource selection procedure. In some examples, p1 may be greater than p2 (e.g., p1 may equal 70% and p2 may equal 30%). That is, the transmitting UE may select a no-sensing mode for a resource selection procedure at a greater probability when the sensing window 305 falls within full-duplex slots compared to when the sensing window 305 falls within half-duplex slots.

In another example, the criteria may include a probability for selecting a sensing mode for each type of full-duplex slot format (e.g., as opposed to just one probability p2). That is, the table 335 may be expanded to include different types of full-duplex slot formats and their associated probability for no-sensing. For example, the table 335 may expanded to include a probability for selecting a no-sensing mode for the full-duplex slot format 315-a (e.g., p3, not shown in FIG. 3) and a probability for selecting a no-sensing mode for the full-duplex slot format 315-b (e.g., p4, not shown in FIG. 3). The full-duplex slot format 315-a may represent in-band full-duplex. As shown in FIG. 3, the transmission resources 325 may overlap the reception resources 320 in the frequency and time domain in the sensing window 305-b. Alternatively, the full-duplex slot format 315-b may represent sub-band full-duplex. As shown in FIG. 3, the transmission resources 325 may be separated from the reception resources 320 in the frequency domain by guard band resources 330. A transmitting UE whose sensing window 305 is associated with the full-duplex slot format 315-a (e.g., sensing window 305-b) may select a no-sensing mode according to p3 for the resource selection procedure, whereas a transmitting UE whose sensing window 305 is associated with the full-duplex slot format 315-b (e.g., sensing window 305-c) may select a no-sensing mode according to p4 for the resource selection procedure. In some examples, p3 may be greater than p4 (e.g., p3 may be 90% and p4 may be 70%). That is, the transmitting UE may select a no-sensing mode for the resource selection procedure with a greater probability when the sensing window 305 is associated with an in-band full-duplex format compared to when the sensing window 305 is associated with a sub-band full-duplex format.

Alternatively or additionally, the criterion may include a probability for selecting a no-sensing mode for each type of full-duplex frequency allocation. That is, the table 335 may be expanded to include different types of full-duplex frequency allocations and their associated probability for selecting a no-sensing mode. In one example, the table 335 may include different probabilities for different ranges of frequency overlap. The greater the frequency overlap, the greater the probability for selecting a no-sensing mode for the resource selection procedure. The full-duplex slot format 315-a may illustrate an example where the frequency overlap is 100% and the full-duplex slot format 315-b may illustrate an example where the frequency overlap is 0%. As such, a transmitting UE may select a no-sensing mode at a greater probability when performing sensing in the sensing window 305-b than in the sensing window 305-c. Alternatively or additionally, the table 335 may include different probabilities for different sizes of guard bands. The greater the size of the of guard band (e.g., the greater the frequency occupied by the guard band resources 330), the smaller the probability of selecting a no-sensing mode for the resource selection procedure.

In some examples, the sensing window 305 may be configured for full-duplex (e.g., a sensing window 305-b or a sensing window 305-c), but the transmitting UE may not transmit on transmission resources 325 during the sensing window 305. In such examples, the criteria may include probabilities for selecting a sensing mode based on whether there is an active transmission during the sensing window 305. That is, the table 335 may include a probability for selecting a no-sensing mode when the UE is actively transmitting during the sensing window 305 and a probability for selecting a no-sensing mode for when the UE is not actively transmitting during the sensing window 305. In some examples, the probability associated with an active transmission in the sensing window may be larger than the probability associated with no active transmission in the sensing window 305. In some examples, the probability associated with no active transmission in the sensing window 305 may be the same as the probability for selecting a no-sensing mode when the sensing window is configured for half-duplex (e.g., p1).

Figure 4:
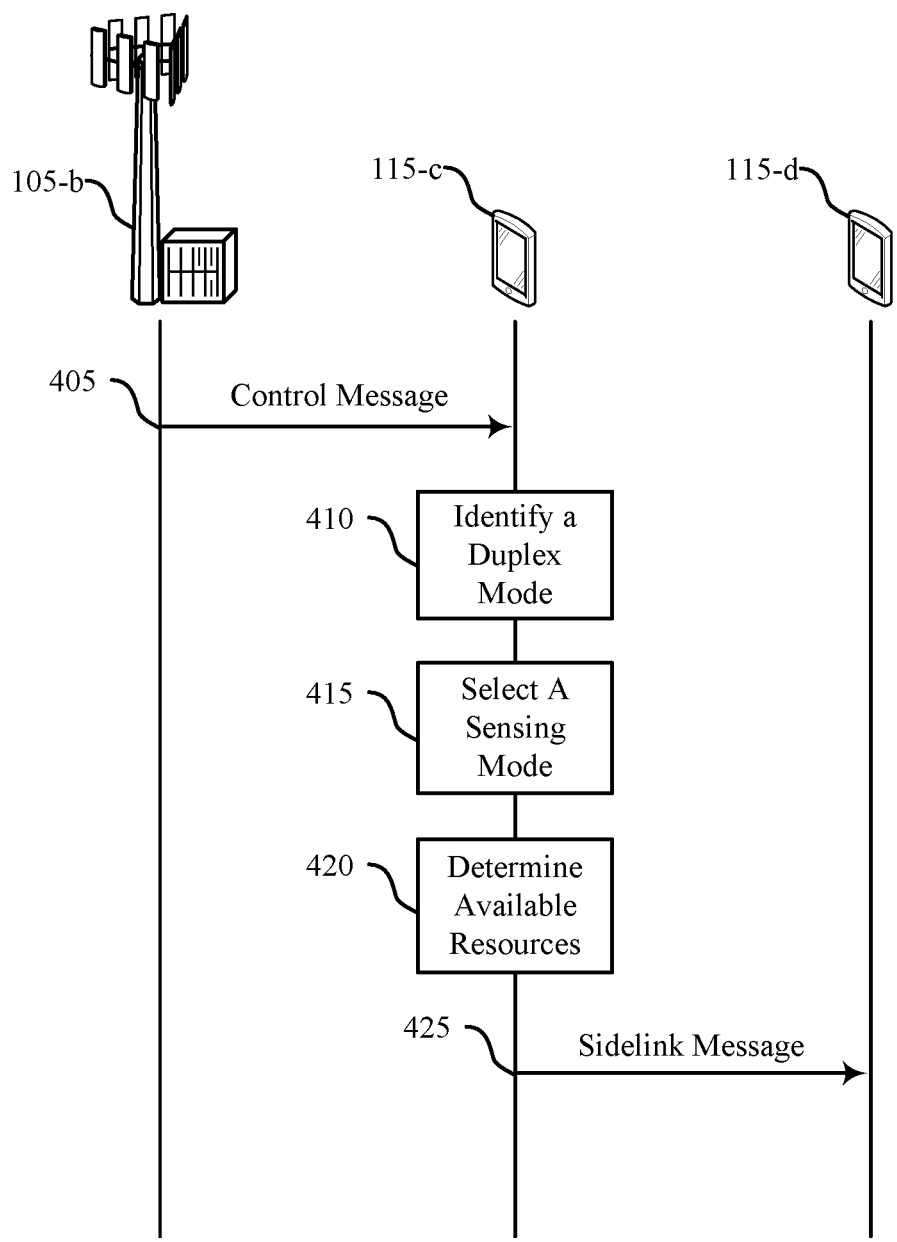
FIG. 4 illustrates an example of a process flow that supports techniques for selecting a sidelink sensing mode based on duplex mode in accordance with aspects of the present disclosure.

FIG. 4 illustrates an example of a process flow 400 that supports techniques for selecting a sidelink sensing mode based on duplex mode in accordance with aspects of the present disclosure. In some examples, the process flow 400 may implement or be implemented by aspects of a wireless communications system 100, a wireless communications system 200, and a sensing scheme 300. For example, the process flow 400 may include a base station 105-b, a UE 115-c, and a UE 115-d which may be examples of a base station 105 and UEs 115 as described with reference to FIGS. 1 and 2. The process flow 400 may involve a UE 115-c selecting a sensing mode for a resource selection procedure based on a duplex mode configured for a sensing window. Alternative examples of the following may be implemented, where some steps are performed in a different order then described or are not performed at all. In some cases, steps may include additional features not mentioned below, or further steps may be added.

At 405, the base station 105-b may transmit a control message to the UE 115-c (e.g., via RRC signaling or MAC-CE signaling). The control message may include a configuration indicating criterion for selecting the sensing mode for the resource selection procedure. In one example, the criterion may be based on the duplex mode configured for the sensing window. For example, the configuration may include instructions to select a no-sensing mode when a full-duplex mode is configured for the sensing window and selecting any other type of sensing mode when a half-duplex mode is configured for the sensing window.

In another example, the criterion may include a first set of probabilities for selecting a sensing mode when the full-duplex mode is configured for the sensing window and a second set of probabilities for selecting a sensing when the half-duplex mode is configured for the sensing window. In some example, the first set of probabilities may include a first probability for selecting a no-sensing mode for the resource selection procedure and the second set of probabilities may include a second probability for selecting a no-sensing mode for the resources selection procedure, where the first probability may be greater than the second probability. Alternatively, the first set of probability may include a probability for each full-duplex slot format (e.g., in-band full-duplex or sub-band full-duplex) or a probability for each full-duplex frequency allocation structure (e.g., different amounts of frequency overlap between transmitting resources and receiving resources, different amounts of frequency allocated to transmitting resources or receiving resources, or different guard band sizes) and the second set of probabilities may include the second probability for selecting a no-sensing mode for the resource selection procedure.

Alternatively or additionally, the criterion may be based on whether the UE 115-c actively transmits during the sensing window. For example, the configuration may include instructions to select a no-sensing mode for the resource selection procedure when time resources of the sensing window are reserved for a transmission by the UE 115-c and select any other type of sensing mode for the resource selection procedure when time resources of the sensing window are not reserved for a transmission by the UE 115-c.

In another example, the criterion may include a third set of probabilities for selecting a sensing mode for a resource selection procedure when the full-duplex mode is configured for the sensing window. The third set of probabilities may include a third probability for selecting the no-sensing mode if the UE 115-c reserves resources in the sensing window for a transmission and fourth probability for selecting a no-sensing mode if the UE 115-c does not reserve resources in the sensing window for a transmission, where the third probability may be greater than the fourth probability.

At 410, the UE 115-c may identify a duplex mode configured for the sensing window. For example, the UE 115-c may identify that the sensing window is configured with a full-duplex mode or is configured with a half-duplex mode. Additionally, if the full-duplex mode is configured for the sensing window, the UE 115-c may identify a slot format of the full-duplex mode (e.g., in-band full-duplex or sub-band full-duplex) or a frequency allocation structure associated with the full-duplex mode. Additionally or alternatively, the UE 115-c may determine whether one or more resources of the sensing window are reserved for a transmission by the UE 115-c.

At 415, the UE 115-c may select a sensing mode for the resource selection procedure. In some examples, the UE 115-c may select the sensing mode according to the configuration indicated via the control message received at 405 using the information identified at 410.

At 420, the UE 115-c may perform sensing according to the sensing mode selected at 415 and determine an available set of resource candidates of a resource selection window. In the case that a no-sensing mode is selected, the UE 115-c may determine the available set of resource candidates randomly. Once the UE 115-c determines the set of available resource candidates, the UE 115-c may select one or more of the available resource candidates for a transmitting a sidelink message to the UE 115-d.

At 425, the UE 115-c may transmit the sidelink message to the UE 115-d using the one or more resources selected at 420. In some examples, the UE 115-c may transmit control information (e.g., SCI), prior to transmitting the message, indicating the selected one or more resources to the UE 115-d.

Figure 5:
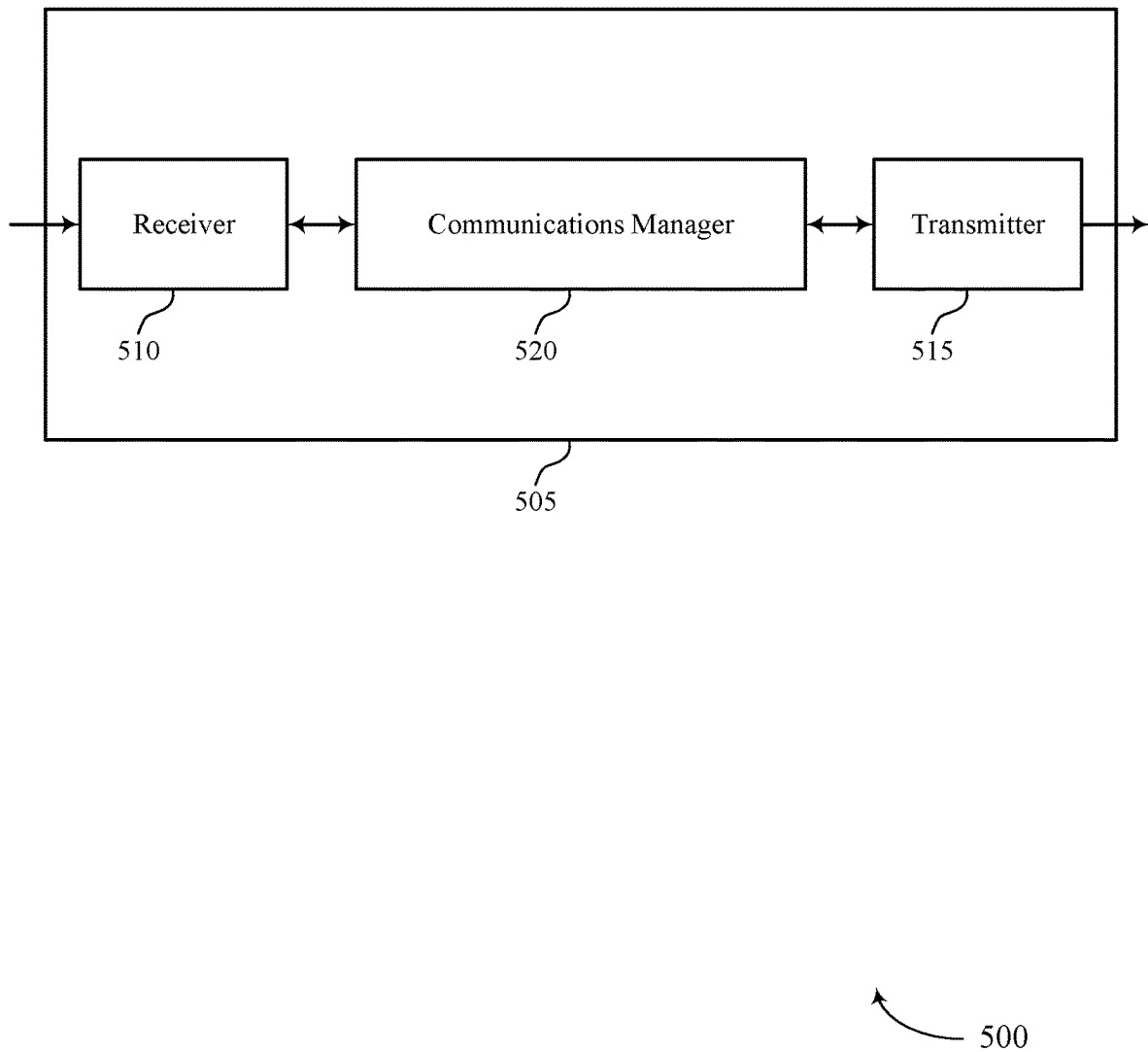
FIGS. 5 and 6 show block diagrams of devices that support techniques for selecting a sidelink sensing mode based on duplex mode in accordance with aspects of the present disclosure.

FIG. 5 shows a block diagram 500 of a device 505 that supports techniques for selecting a sidelink sensing mode based on duplex mode in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for selecting a sidelink sensing mode based on duplex mode). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for selecting a sidelink sensing mode based on duplex mode). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for selecting a sidelink sensing mode based on duplex mode as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving control signaling indicating a configuration including one or more criterion for selecting a sensing mode from a set of multiple sensing modes for a sidelink resource selection procedure. The communications manager 520 may be configured as or otherwise support a means for selecting the sensing mode from the set of multiple sensing modes based on the configuration and a duplex mode configured for a sensing window for the sidelink resource selection procedure. The communications manager 520 may be configured as or otherwise support a means for determining an available set of sidelink resource candidates from a selection window based on the selected sensing mode. The communications manager 520 may be configured as or otherwise support a means for transmitting a sidelink message using one or more resources of the available set of sidelink resource candidates.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and more efficient utilization of communication resources. Using the techniques described herein, the device 505 may perform no-sensing at a higher rate in situations where signal measurements may be inaccurate allowing the device 505 to save power and select resources for sidelink transmissions more efficiently.

Figure 6:
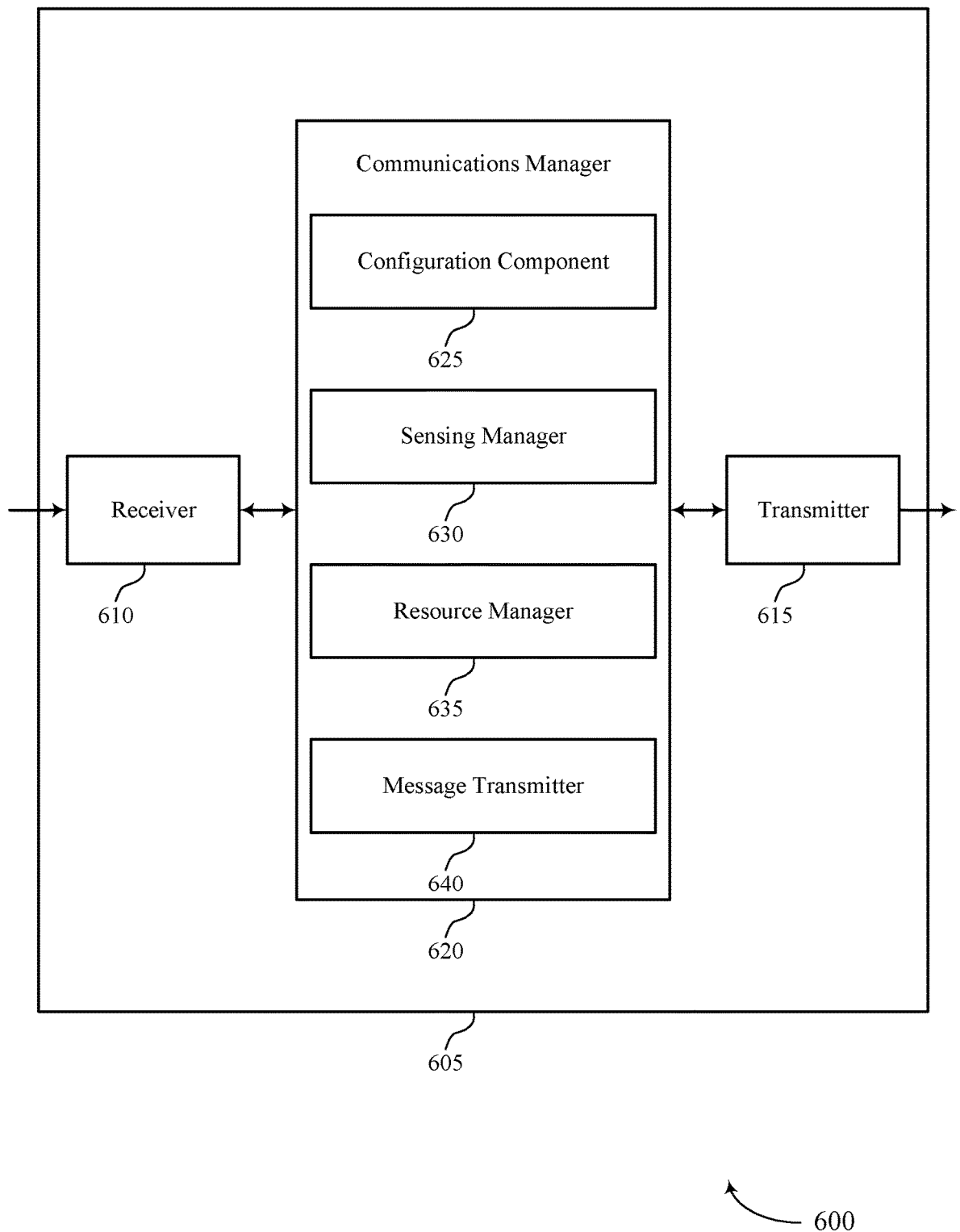

FIG. 6 shows a block diagram 600 of a device 605 that supports techniques for selecting a sidelink sensing mode based on duplex mode in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for selecting a sidelink sensing mode based on duplex mode). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for selecting a sidelink sensing mode based on duplex mode). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for selecting a sidelink sensing mode based on duplex mode as described herein. For example, the communications manager 620 may include a configuration component 625, a sensing manager 630, a resource manager 635, a message transmitter 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The configuration component 625 may be configured as or otherwise support a means for receiving control signaling indicating a configuration including one or more criterion for selecting a sensing mode from a set of multiple sensing modes for a sidelink resource selection procedure. The sensing manager 630 may be configured as or otherwise support a means for selecting the sensing mode from the set of multiple sensing modes based on the configuration and a duplex mode configured for a sensing window for the sidelink resource selection procedure. The resource manager 635 may be configured as or otherwise support a means for determining an available set of sidelink resource candidates from a selection window based on the selected sensing mode. The message transmitter 640 may be configured as or otherwise support a means for transmitting a sidelink message using one or more resources of the available set of sidelink resource candidates.

Figure 7:
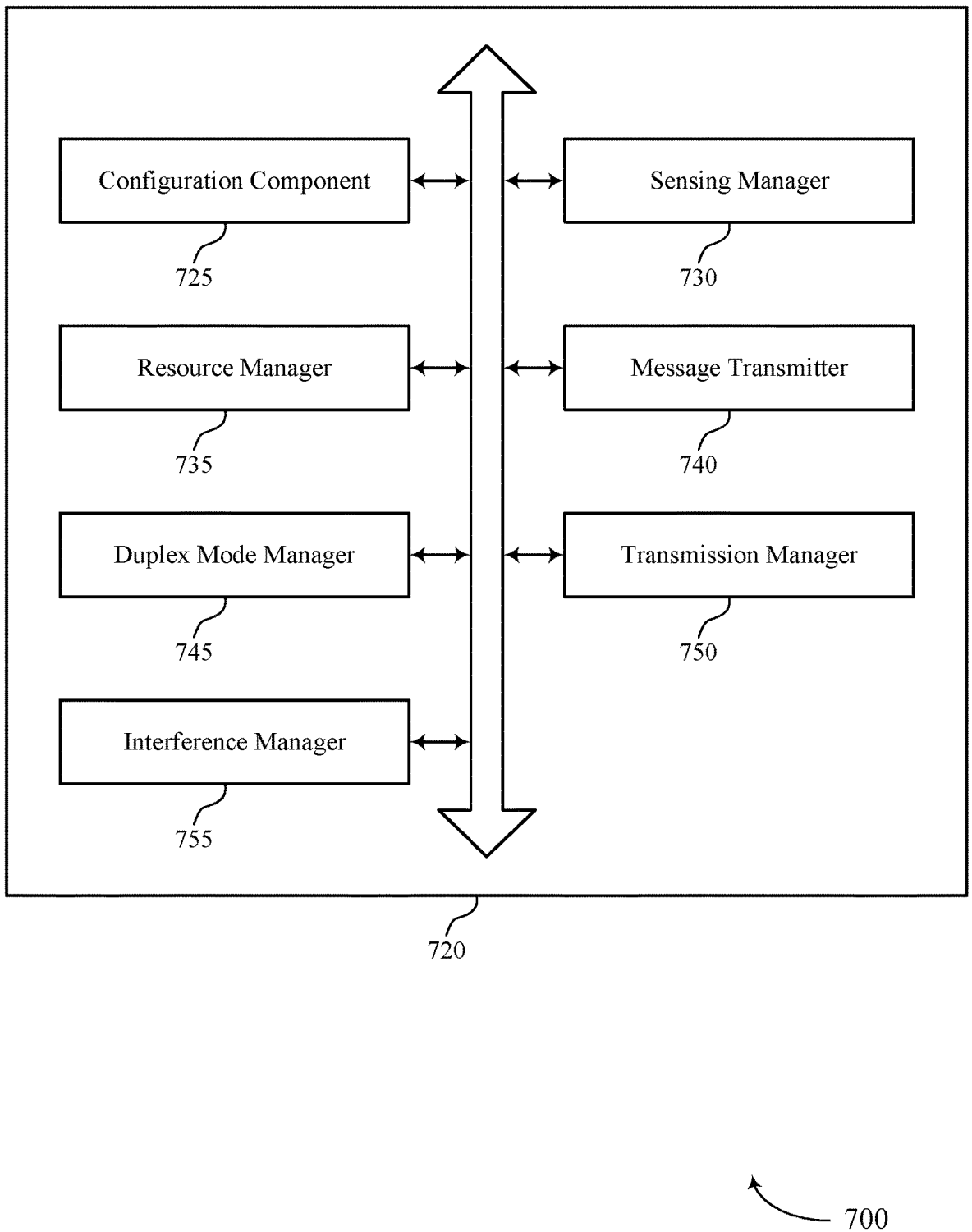
FIG. 7 shows a block diagram of a communications manager that supports techniques for selecting a sidelink sensing mode based on duplex mode in accordance with aspects of the present disclosure.

FIG. 7 shows a block diagram 700 of a communications manager 720 that supports techniques for selecting a sidelink sensing mode based on duplex mode in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for selecting a sidelink sensing mode based on duplex mode as described herein. For example, the communications manager 720 may include a configuration component 725, a sensing manager 730, a resource manager 735, a message transmitter 740, a duplex mode manager 745, a transmission manager 750, an interference manager 755, or any combination thereof. Each of these components may communicate, directly or indirectly, with one another (e.g., via one or more buses).

The communications manager 720 may support wireless communication at a UE in accordance with examples as disclosed herein. The configuration component 725 may be configured as or otherwise support a means for receiving control signaling indicating a configuration including one or more criterion for selecting a sensing mode from a set of multiple sensing modes for a sidelink resource selection procedure. The sensing manager 730 may be configured as or otherwise support a means for selecting the sensing mode from the set of multiple sensing modes based on the configuration and a duplex mode configured for a sensing window for the sidelink resource selection procedure. The resource manager 735 may be configured as or otherwise support a means for determining an available set of sidelink resource candidates from a selection window based on the selected sensing mode. The message transmitter 740 may be configured as or otherwise support a means for transmitting a sidelink message using one or more resources of the available set of sidelink resource candidates.

In some examples, the duplex mode manager 745 may be configured as or otherwise support a means for determining whether the duplex mode configured for the sensing window includes a full-duplex mode or a half-duplex mode, where the one or more criterion are based on whether the duplex mode configured for the sensing window includes the full-duplex mode or the half-duplex mode.

In some examples, the one or more criterion include a first set of probabilities for selecting the sensing mode when the duplex mode configured for the sensing window includes a full-duplex mode and a second set of probabilities for selecting the sensing mode when the duplex mode configured for the sensing window includes a half-duplex mode.

In some examples, the duplex mode manager 745 may be configured as or otherwise support a means for determining that the duplex mode configured for the sensing window includes the full-duplex mode, where the sensing mode is selected according to a probability of the first set of probabilities.

In some examples, the duplex mode manager 745 may be configured as or otherwise support a means for determining that the duplex mode configured for the sensing window includes the half-duplex mode, where the sensing mode is selected according to a probability of the second set of probabilities.

In some examples, the first set of probabilities and the second set of probabilities include probabilities of selecting a no-sensing mode from the set of multiple sensing modes.

In some examples, the first set of probabilities include probability values that are greater than one or more probability values of the second set of probabilities.

In some examples, the set of multiple sensing modes include at least a no-sensing mode, a partial-sensing mode, and a full-sensing mode.

In some examples, each probability of the first set of probabilities corresponds to a respective frequency allocation structure of a set of multiple frequency allocation structures for a time resource associated with the sensing window. In some examples, the set of multiple frequency allocation structures includes an in-band full-duplex structure and a sub-band full-duplex structure.

In some examples, the transmission manager 750 may be configured as or otherwise support a means for determining that a time resource associated with the sensing window is reserved for a transmission by the UE, where selecting the sensing mode is based at least on determining that the time resource associated with the sensing window is reserved for the transmission by the UE during the sensing window.

In some examples, to support selecting the sensing mode from the set of multiple sensing modes, the sensing manager 730 may be configured as or otherwise support a means for selecting a no-sensing mode based on determining that the time resource associated with the sensing window is reserved for the transmission by the UE.

In some examples, the interference manager 755 may be configured as or otherwise support a means for measuring an amount of interference associated with reference signaling in the sensing window based on the selected sensing mode, where determining the available set of sidelink resource candidates is based on measuring the amount of interference.

In some examples, to support measuring the amount of interference, the interference manager 755 may be configured as or otherwise support a means for measuring an RSRP associated with the reference signaling in the sensing window, an SINR associated with the reference signaling in the sensing window, or both.

In some examples, to support receiving control signaling indicating the configuration, the configuration component 725 may be configured as or otherwise support a means for receiving RRC signaling or MAC-CE signaling from a base station.

Figure 8:
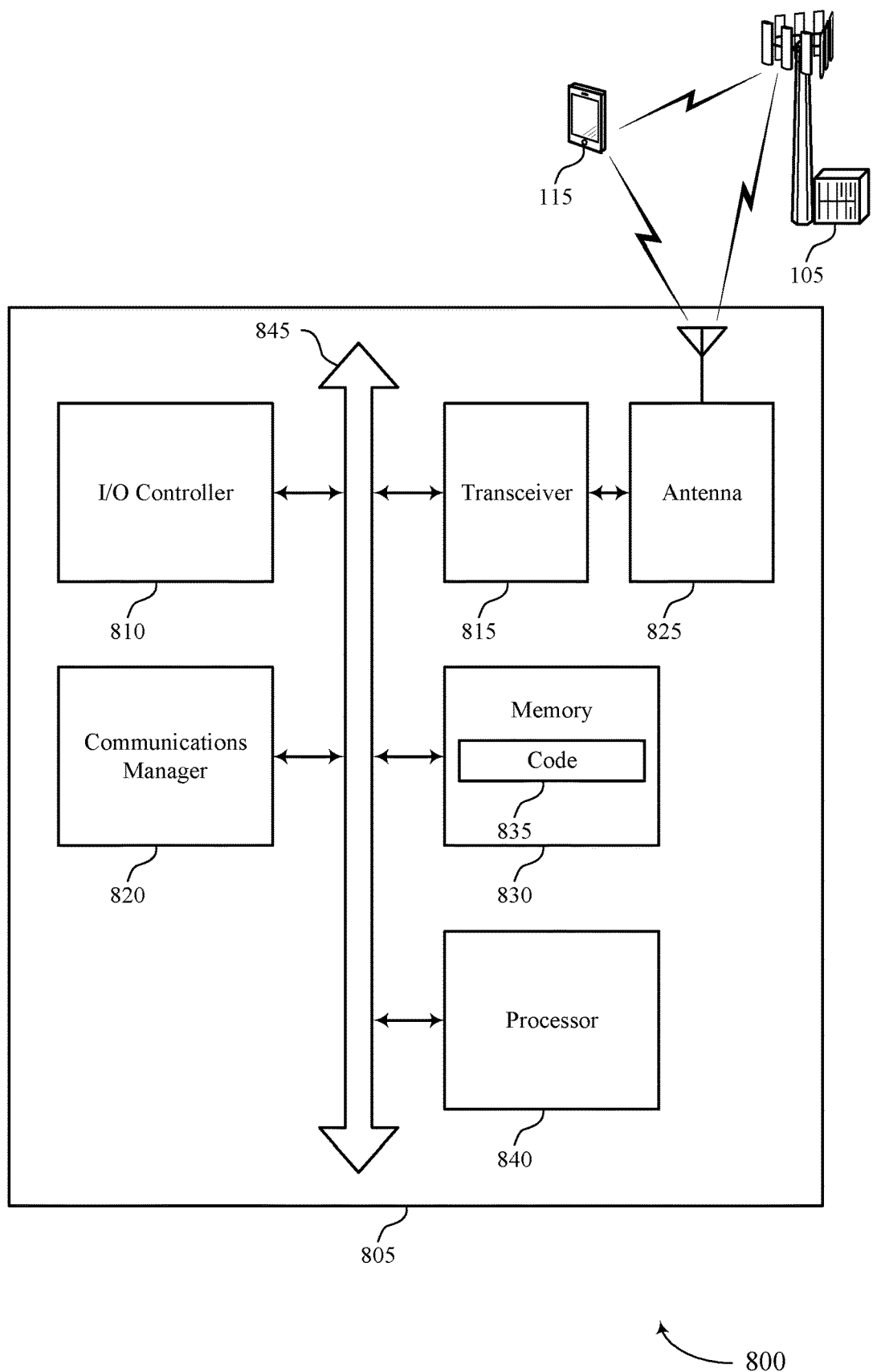
FIG. 8 shows a diagram of a system including a device that supports techniques for selecting a sidelink sensing mode based on duplex mode in accordance with aspects of the present disclosure.

FIG. 8 shows a diagram of a system 800 including a device 805 that supports techniques for selecting a sidelink sensing mode based on duplex mode in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for selecting a sidelink sensing mode based on duplex mode). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling indicating a configuration including one or more criterion for selecting a sensing mode from a set of multiple sensing modes for a sidelink resource selection procedure. The communications manager 820 may be configured as or otherwise support a means for selecting the sensing mode from the set of multiple sensing modes based on the configuration and a duplex mode configured for a sensing window for the sidelink resource selection procedure. The communications manager 820 may be configured as or otherwise support a means for determining an available set of sidelink resource candidates from a selection window based on the selected sensing mode. The communications manager 820 may be configured as or otherwise support a means for transmitting a sidelink message using one or more resources of the available set of sidelink resource candidates.

By including or configuring the communications manager 820 in accordance with examples as described herein, the device 805 may support techniques for reduced power consumption and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for selecting a sidelink sensing mode based on duplex mode as described herein, or the processor 840 and the memory 830 may be otherwise configured to perform or support such operations.

Figure 9:
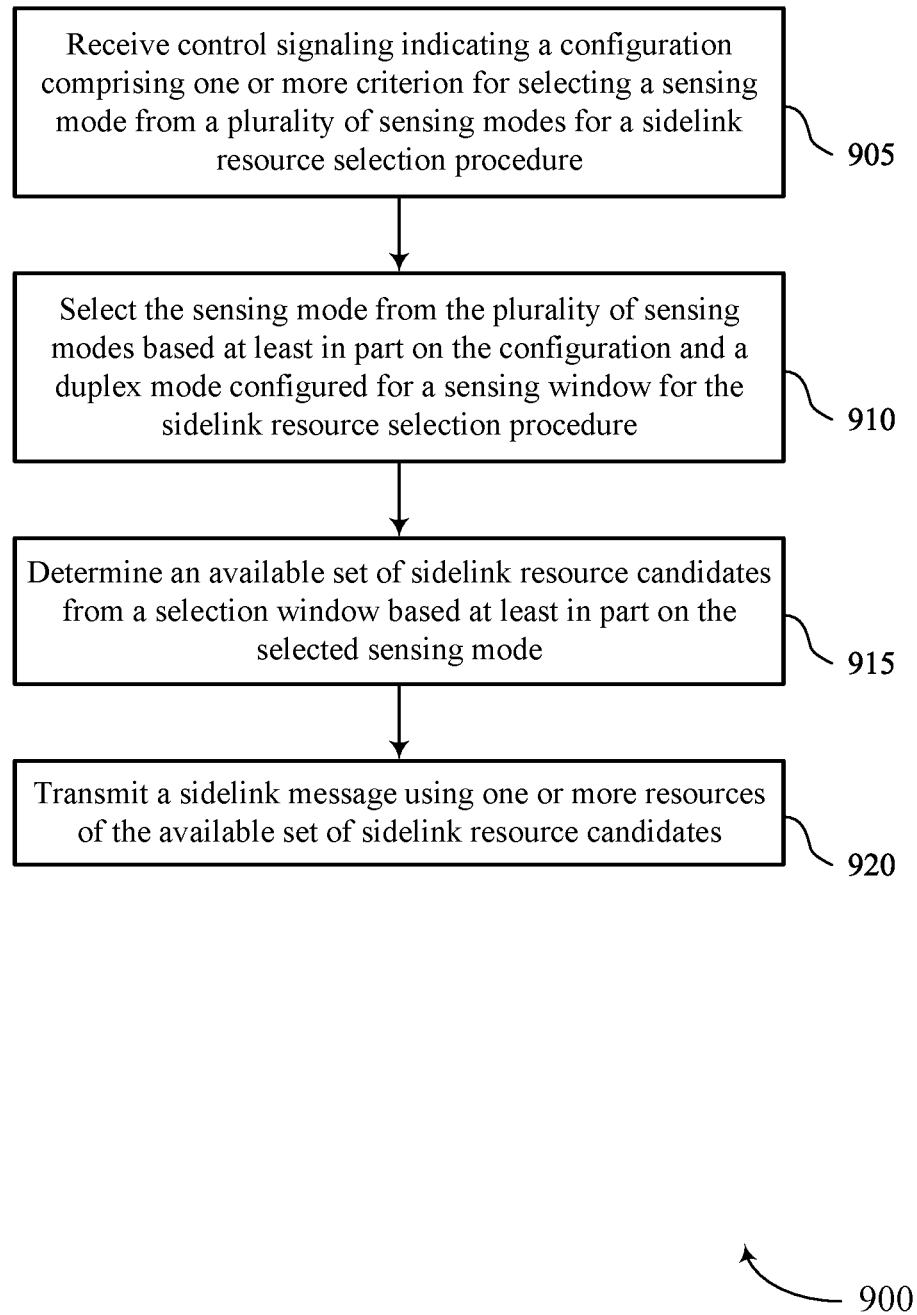
FIGS. 9 through 11 show flowcharts illustrating methods that support techniques for selecting a sidelink sensing mode based on duplex mode in accordance with aspects of the present disclosure.

FIG. 9 shows a flowchart illustrating a method 900 that supports techniques for selecting a sidelink sensing mode based on duplex mode in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving control signaling indicating a configuration including one or more criterion for selecting a sensing mode from a set of multiple sensing modes for a sidelink resource selection procedure. The operations of 905 may be performed in accordance with examples as disclosed herein. In some examples, aspects of the operations of 905 may be performed by a configuration component 725 as described with reference to FIG. 7.

At 910, the method may include selecting the sensing mode from the set of multiple sensing modes based on the configuration and a duplex mode configured for a sensing window for the sidelink resource selection procedure. The operations of 910 may be performed in accordance with examples as disclosed herein. In some examples, aspects of the operations of 910 may be performed by a sensing manager 730 as described with reference to FIG. 7.

At 915, the method may include determining an available set of sidelink resource candidates from a selection window based on the selected sensing mode. The operations of 915 may be performed in accordance with examples as disclosed herein. In some examples, aspects of the operations of 915 may be performed by a resource manager 735 as described with reference to FIG. 7.

At 920, the method may include transmitting a sidelink message using one or more resources of the available set of sidelink resource candidates. The operations of 920 may be performed in accordance with examples as disclosed herein. In some examples, aspects of the operations of 920 may be performed by a message transmitter 740 as described with reference to FIG. 7.

Figure 10:
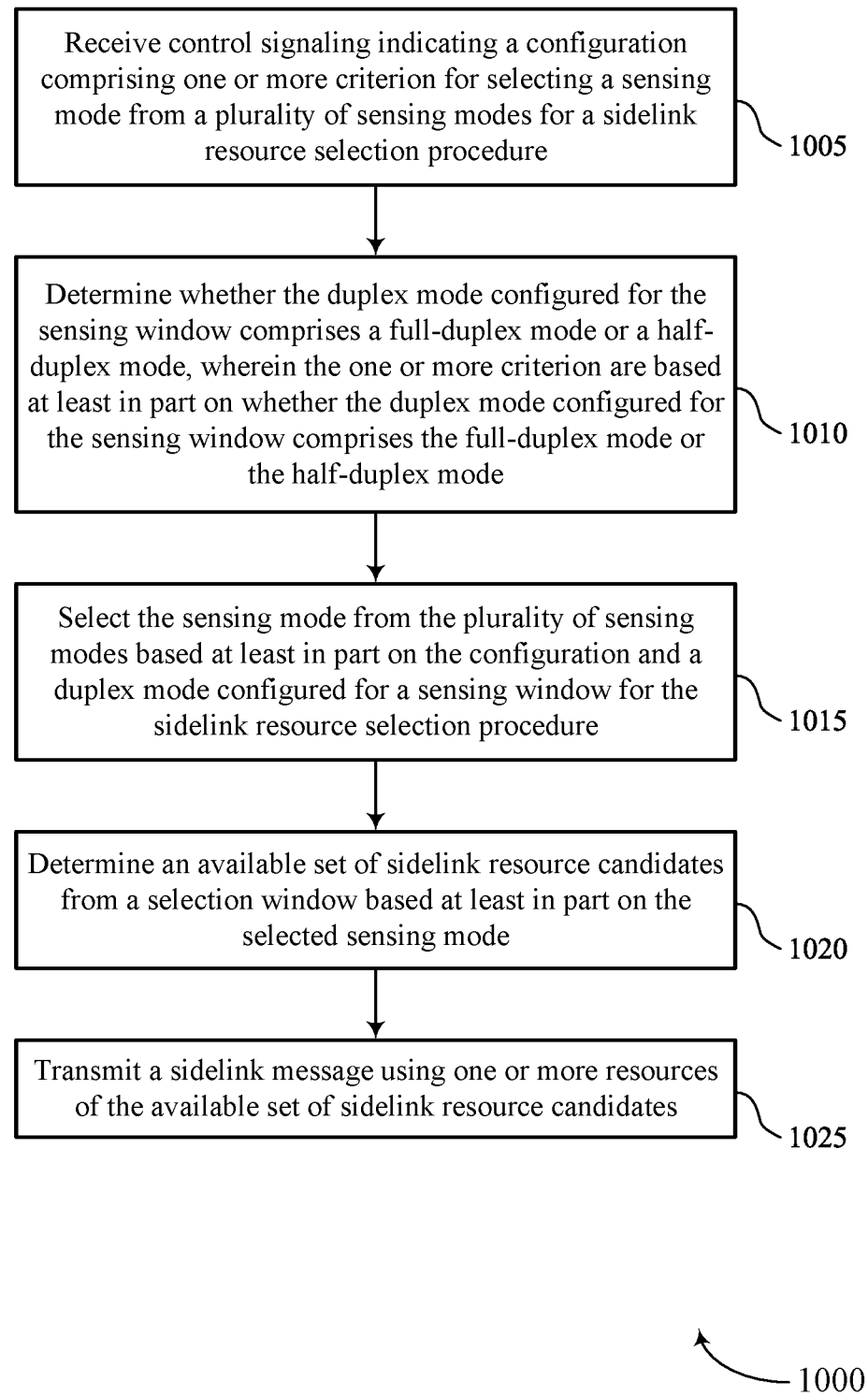

FIG. 10 shows a flowchart illustrating a method 1000 that supports techniques for selecting a sidelink sensing mode based on duplex mode in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving control signaling indicating a configuration including one or more criterion for selecting a sensing mode from a set of multiple sensing modes for a sidelink resource selection procedure. The operations of 1005 may be performed in accordance with examples as disclosed herein. In some examples, aspects of the operations of 1005 may be performed by a configuration component 725 as described with reference to FIG. 7.

At 1010, the method may include determining whether the duplex mode configured for the sensing window includes a full-duplex mode or a half-duplex mode, where the one or more criterion are based on whether the duplex mode configured for the sensing window includes the full-duplex mode or the half-duplex mode. The operations of 1010 may be performed in accordance with examples as disclosed herein. In some examples, aspects of the operations of 1010 may be performed by a duplex mode manager 745 as described with reference to FIG. 7.

At 1015, the method may include selecting the sensing mode from the set of multiple sensing modes based on the configuration and a duplex mode configured for a sensing window for the sidelink resource selection procedure. The operations of 1015 may be performed in accordance with examples as disclosed herein. In some examples, aspects of the operations of 1015 may be performed by a sensing manager 730 as described with reference to FIG. 7.

At 1020, the method may include determining an available set of sidelink resource candidates from a selection window based on the selected sensing mode. The operations of 1020 may be performed in accordance with examples as disclosed herein. In some examples, aspects of the operations of 1020 may be performed by a resource manager 735 as described with reference to FIG. 7.

At 1025, the method may include transmitting a sidelink message using one or more resources of the available set of sidelink resource candidates. The operations of 1025 may be performed in accordance with examples as disclosed herein. In some examples, aspects of the operations of 1025 may be performed by a message transmitter 740 as described with reference to FIG. 7.

Figure 11:
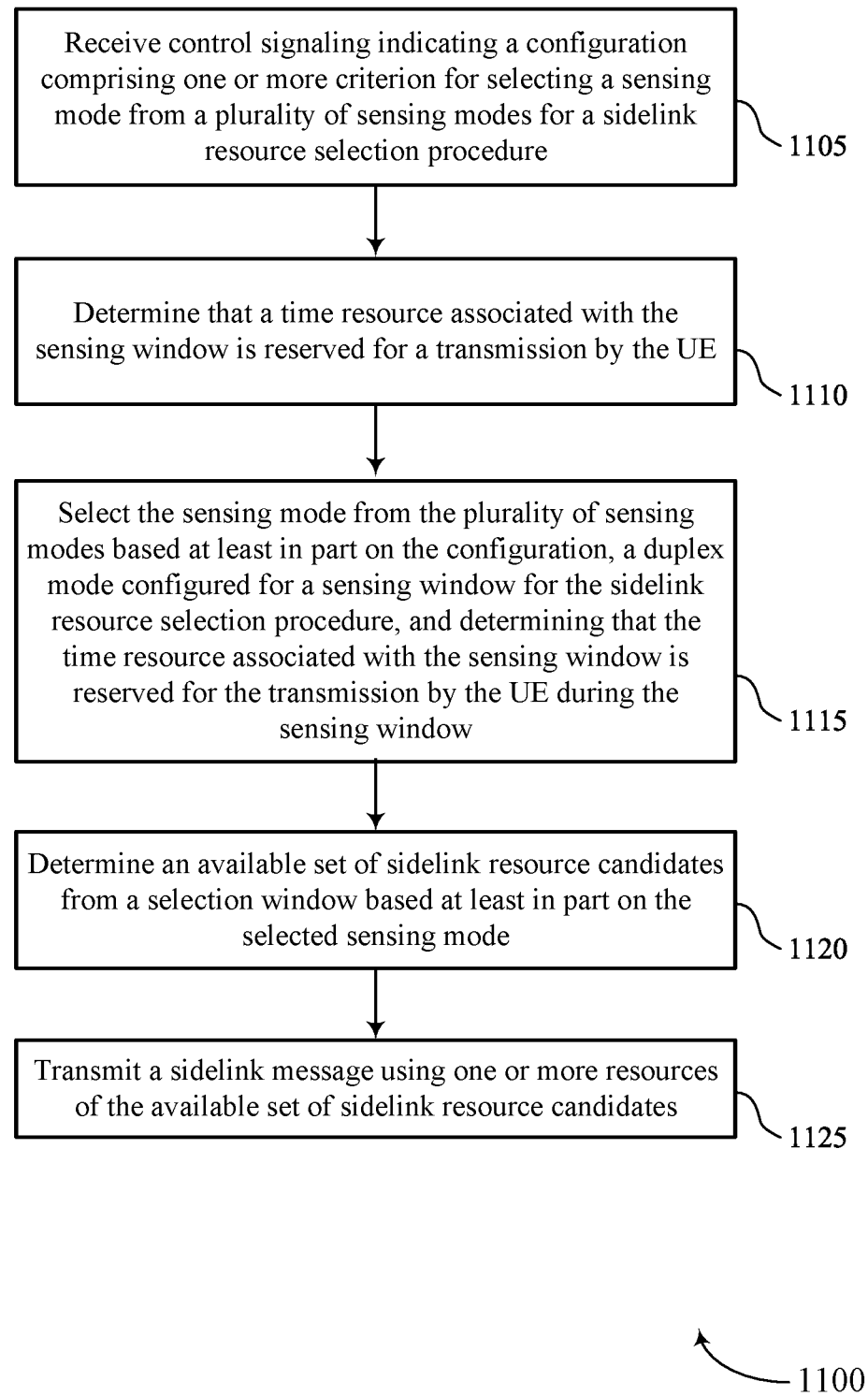

FIG. 11 shows a flowchart illustrating a method 1100 that supports techniques for selecting a sidelink sensing mode based on duplex mode in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving control signaling indicating a configuration including one or more criterion for selecting a sensing mode from a set of multiple sensing modes for a sidelink resource selection procedure. The operations of 1105 may be performed in accordance with examples as disclosed herein. In some examples, aspects of the operations of 1105 may be performed by a configuration component 725 as described with reference to FIG. 7.

At 1110, the method may include determining that a time resource associated with the sensing window is reserved for a transmission by the UE. The operations of 1110 may be performed in accordance with examples as disclosed herein. In some examples, aspects of the operations of 1110 may be performed by a transmission manager 750 as described with reference to FIG. 7.

At 1115, the method may include selecting the sensing mode from the set of multiple sensing modes based on the configuration, a duplex mode configured for a sensing window for the sidelink resource selection procedure, and determining that the time resource associated with the sensing window is reserved for the transmission by the UE during the sensing window. The operations of 1115 may be performed in accordance with examples as disclosed herein. In some examples, aspects of the operations of 1115 may be performed by a sensing manager 730 as described with reference to FIG. 7.

At 1120, the method may include determining an available set of sidelink resource candidates from a selection window based on the selected sensing mode. The operations of 1120 may be performed in accordance with examples as disclosed herein. In some examples, aspects of the operations of 1120 may be performed by a resource manager 735 as described with reference to FIG. 7.

At 1125, the method may include transmitting a sidelink message using one or more resources of the available set of sidelink resource candidates. The operations of 1125 may be performed in accordance with examples as disclosed herein. In some examples, aspects of the operations of 1125 may be performed by a message transmitter 740 as described with reference to FIG. 7.

The following provides an overview of aspects of the present disclosure:

Aspect 1: A method for wireless communication at a UE, comprising: receiving control signaling indicating a configuration comprising one or more criterion for selecting a sensing mode from a plurality of sensing modes for a sidelink resource selection procedure; selecting the sensing mode from the plurality of sensing modes based at least in part on the configuration and a duplex mode configured for a sensing window for the sidelink resource selection procedure; determining an available set of sidelink resource candidates from a selection window based at least in part on the selected sensing mode; and transmitting a sidelink message using one or more resources of the available set of sidelink resource candidates.

Aspect 2: The method of aspect 1, further comprising: determining whether the duplex mode configured for the sensing window comprises a full-duplex mode or a half-duplex mode, wherein the one or more criterion are based at least in part on whether the duplex mode configured for the sensing window comprises the full-duplex mode or the half-duplex mode.

Aspect 3: The method of any of aspects 1 through 2, wherein the one or more criterion comprise a first set of probabilities for selecting the sensing mode when the duplex mode configured for the sensing window comprises a full-duplex mode and a second set of probabilities for selecting the sensing mode when the duplex mode configured for the sensing window comprises a half-duplex mode.

Aspect 4: The method of aspect 3, further comprising: determining that the duplex mode configured for the sensing window comprises the full-duplex mode, wherein the sensing mode is selected according to a probability of the first set of probabilities.

Aspect 5: The method of aspect 3, further comprising: determining that the duplex mode configured for the sensing window comprises the half-duplex mode, wherein the sensing mode is selected according to a probability of the second set of probabilities.

Aspect 6: The method of any of aspects 3 through 5, wherein the first set of probabilities and the second set of probabilities comprise probabilities of selecting a no-sensing mode from the plurality of sensing modes.

Aspect 7: The method of aspect 6, wherein the first set of probabilities comprise probability values that are greater than one or more probability values of the second set of probabilities.

Aspect 8: The method of any of aspects 3 through 7, wherein the plurality of sensing modes comprise at least a no-sensing mode, a partial-sensing mode, and a full-sensing mode.

Aspect 9: The method of any of aspects 3 through 8, wherein each probability of the first set of probabilities corresponds to a respective frequency allocation structure of a plurality of frequency allocation structures for a time resource associated with the sensing window.

Aspect 10: The method of aspect 9, wherein the plurality of frequency allocation structures comprises an in-band full-duplex structure and a sub-band full-duplex structure.

Aspect 11: The method of any of aspects 1 through 10, further comprising: determining that a time resource associated with the sensing window is reserved for a transmission by the UE, wherein selecting the sensing mode is based at least on determining that the time resource associated with the sensing window is reserved for the transmission by the UE during the sensing window.

Aspect 12: The method of aspect 11, wherein selecting the sensing mode from the plurality of sensing modes comprises: selecting a no-sensing mode based at least in part on determining that the time resource associated with the sensing window is reserved for the transmission by the UE.

Aspect 13: The method of any of aspects 1 through 12, further comprising: measuring an amount of interference associated with reference signaling in the sensing window based at least in part on the selected sensing mode, wherein determining the available set of sidelink resource candidates is based at least in part on measuring the amount of interference.

Aspect 14: The method of aspect 13, wherein measuring the amount of interference comprises: measuring an RSRP associated with the reference signaling in the sensing window, an SINR associated with the reference signaling in the sensing window, or both.

Aspect 15: The method of any of aspects 1 through 14, wherein receiving control signaling indicating the configuration comprises: receiving RRC signaling or MAC-CE signaling from a base station.

Aspect 16: An apparatus for wireless communication at a UE, comprising a processor; memory coupled with the processor; and instructions stored in the memory and executable by the processor to cause the apparatus to perform a method of any of aspects 1 through 15.

Aspect 17: An apparatus for wireless communication at a UE, comprising at least one means for performing a method of any of aspects 1 through 15.

Aspect 18: A non-transitory computer-readable medium storing code for wireless communication at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling indicating a configuration comprising one or more criterion for selecting a sensing mode from a plurality of sensing modes for a sidelink resource selection procedure, wherein the one or more criterion is based at least in part on a duplex mode configured for a sensing window for the sidelink resource selection procedure;
   selecting the sensing mode from the plurality of sensing modes based at least in part on the configuration and the duplex mode;
   determining an available set of sidelink resource candidates from a selection window based at least in part on the selected sensing mode; and
   transmitting a sidelink message using one or more resources of the available set of sidelink resource candidates.

2. The method of claim 1, further comprising:
   determining whether the duplex mode configured for the sensing window comprises a full-duplex mode or a half-duplex mode, wherein the one or more criterion are based at least in part on whether the duplex mode configured for the sensing window comprises the full-duplex mode or the half-duplex mode.

3. The method of claim 1, wherein the one or more criterion comprise a first set of probabilities for selecting the sensing mode when the duplex mode configured for the sensing window comprises a full-duplex mode and a second set of probabilities for selecting the sensing mode when the duplex mode configured for the sensing window comprises a half-duplex mode.

4. The method of claim 3, further comprising:
   determining that the duplex mode configured for the sensing window comprises the full-duplex mode, wherein the sensing mode is selected according to a probability of the first set of probabilities.

5. The method of claim 3, further comprising:
   determining that the duplex mode configured for the sensing window comprises the half-duplex mode, wherein the sensing mode is selected according to a probability of the second set of probabilities.

6. The method of claim 3, wherein the first set of probabilities and the second set of probabilities comprise probabilities of selecting a no-sensing mode from the plurality of sensing modes.

7. The method of claim 6, wherein the first set of probabilities comprise probability values that are greater than one or more probability values of the second set of probabilities.

8. The method of claim 3, wherein the plurality of sensing modes comprise at least a no-sensing mode, a partial-sensing mode, and a full-sensing mode.

9. The method of claim 3, wherein each probability of the first set of probabilities corresponds to a respective frequency allocation structure of a plurality of frequency allocation structures for a time resource associated with the sensing window.

10. The method of claim 9, wherein the plurality of frequency allocation structures comprises an in-band full-duplex structure and a sub-band full-duplex structure.

11. The method of claim 1, further comprising:
determining that a time resource associated with the sensing window is reserved for a transmission by the UE, wherein selecting the sensing mode is based at least on determining that the time resource associated with the sensing window is reserved for the transmission by the UE during the sensing window.

12. The method of claim 11, wherein selecting the sensing mode from the plurality of sensing modes comprises:
selecting a no-sensing mode based at least in part on determining that the time resource associated with the sensing window is reserved for the transmission by the UE.

13. The method of claim 1, further comprising:
measuring an amount of interference associated with reference signaling in the sensing window based at least in part on the selected sensing mode, wherein determining the available set of sidelink resource candidates is based at least in part on measuring the amount of interference.

14. The method of claim 13, wherein measuring the amount of interference comprises:
measuring a reference signal received power associated with the reference signaling in the sensing window, a signal-to-interference-plus-noise ratio associated with the reference signaling in the sensing window, or both.

15. The method of claim 1, wherein receiving control signaling indicating the configuration comprises:
receiving radio resource control signaling or medium access control control element signaling from a network device.

16. An apparatus for wireless communication at a user equipment (UE), comprising:
a processor;
memory coupled with the processor; and
instructions stored in the memory and executable by the processor to cause the apparatus to:
receive control signaling indicating a configuration comprising one or more criterion for selecting a sensing mode from a plurality of sensing modes for a sidelink resource selection procedure, wherein the one or more criterion is based at least in part on a duplex mode configured for a sensing window for the sidelink resource selection procedure;
select the sensing mode from the plurality of sensing modes based at least in part on the configuration and the duplex mode;
determine an available set of sidelink resource candidates from a selection window based at least in part on the selected sensing mode; and
transmit a sidelink message using one or more resources of the available set of sidelink resource candidates.

17. The apparatus of claim 16, wherein the instructions are further executable by the processor to cause the apparatus to:
determine whether the duplex mode configured for the sensing window comprises a full-duplex mode or a half-duplex mode, wherein the one or more criterion are based at least in part on whether the duplex mode configured for the sensing window comprises the full-duplex mode or the half-duplex mode.

18. The apparatus of claim 16, wherein the one or more criterion comprise a first set of probabilities for selecting the sensing mode when the duplex mode configured for the sensing window comprises a full-duplex mode and a second set of probabilities for selecting the sensing mode when the duplex mode configured for the sensing window comprises a half-duplex mode.

19. The apparatus of claim 18, wherein the instructions are further executable by the processor to cause the apparatus to:
determine that the duplex mode configured for the sensing window comprises the full-duplex mode, wherein the sensing mode is selected according to a probability of the first set of probabilities.

20. The apparatus of claim 18, wherein the instructions are further executable by the processor to cause the apparatus to:
determine that the duplex mode configured for the sensing window comprises the half-duplex mode, wherein the sensing mode is selected according to a probability of the second set of probabilities.

21. The apparatus of claim 18, wherein the first set of probabilities and the second set of probabilities comprise probabilities of selecting a no-sensing mode from the plurality of sensing modes.

22. The apparatus of claim 21, wherein the first set of probabilities comprise probability values that are greater than one or more probability values of the second set of probabilities.

23. The apparatus of claim 18, wherein the plurality of sensing modes comprise at least a no-sensing mode, a partial-sensing mode, and a full-sensing mode.

24. The apparatus of claim 18, wherein each probability of the first set of probabilities corresponds to a respective frequency allocation structure of a plurality of frequency allocation structures for a time resource associated with the sensing window.

25. The apparatus of claim 24, wherein the plurality of frequency allocation structures comprises an in-band full-duplex structure and a sub-band full-duplex structure.

26. The apparatus of claim 16, wherein the instructions are further executable by the processor to cause the apparatus to:
determine that a time resource associated with the sensing window is reserved for a transmission by the UE, wherein selecting the sensing mode is based at least on determining that the time resource associated with the sensing window is reserved for the transmission by the UE during the sensing window.

27. The apparatus of claim 26, wherein the instructions to select the sensing mode from the plurality of sensing modes are executable by the processor to cause the apparatus to:
select a no-sensing mode based at least in part on determining that the time resource associated with the sensing window is reserved for the transmission by the UE.

28. The apparatus of claim 16, wherein the instructions to receive control signaling indicating the configuration are executable by the processor to cause the apparatus to:
receive radio resource control signaling or medium access control control element signaling from a network device.

29. A non-transitory computer-readable medium storing code for wireless communication at a user equipment (UE), the code comprising instructions executable by a processor to:
receive control signaling indicating a configuration comprising one or more criterion for selecting a sensing mode from a plurality of sensing modes for a sidelink resource selection procedure, wherein the one or more criterion is based at least in part on a duplex mode configured for a sensing window for the sidelink resource selection procedure;

select the sensing mode from the plurality of sensing modes based at least in part on the configuration and the duplex mode;

determine an available set of sidelink resource candidates from a selection window based at least in part on the selected sensing mode; and transmit a sidelink message using one or more resources of the available set of sidelink resource candidates.

* * * * *